United States Patent
Takeuchi et al.

(10) Patent No.: US 10,184,801 B2
(45) Date of Patent: Jan. 22, 2019

(54) ROUTE SEARCHING APPARATUS AND ROUTE SEARCHING METHOD

(71) Applicant: CLARION CO., LTD., Saitama (JP)

(72) Inventors: Ryosuke Takeuchi, Saitama (JP); Akio Sumizawa, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/555,727

(22) PCT Filed: Apr. 11, 2016

(86) PCT No.: PCT/JP2016/061681
§ 371 (c)(1),
(2) Date: Sep. 5, 2017

(87) PCT Pub. No.: WO2016/171022
PCT Pub. Date: Oct. 27, 2016

(65) Prior Publication Data
US 2018/0058865 A1    Mar. 1, 2018

(30) Foreign Application Priority Data

Apr. 21, 2015   (JP) .................................. 2015-087022

(51) Int. Cl.
*G01C 22/00*   (2006.01)
*G05D 1/00*   (2006.01)
(Continued)

(52) U.S. Cl.
CPC ......... *G01C 21/3423* (2013.01); *G01C 21/34* (2013.01); *G01C 21/3617* (2013.01);
(Continued)

(58) Field of Classification Search
CPC ... G01C 21/34; G01C 21/3617; G05D 1/0088
(Continued)

(56) References Cited

U.S. PATENT DOCUMENTS

| 5,568,390 A   | * | 10/1996 | Hirota  | G01C 21/3469 |
|               |   |         |         | 340/990      |
| 2004/0068366 A1 | * | 4/2004 | Nisiyama | G01C 21/3461 |
|               |   |         |         | 701/25       |

FOREIGN PATENT DOCUMENTS

| JP | 2004-125726 A |   | 4/2004  |
|----|---------------|---|---------|
| JP | 2008-009913 A |   | 1/2008  |
| JP | 2008-180591 A |   | 8/2008  |
| JP | 2014-232509 A |   | 12/2014 |
| JP | 2014232509 A  | * | 12/2014 |

OTHER PUBLICATIONS

English Translation for JP2014232509A.*
(Continued)

*Primary Examiner* — Mahmoud S Ismail
(74) *Attorney, Agent, or Firm* — IP Business Solutions, LLC

(57) ABSTRACT

A guide route matching with the characteristic of vehicle control is searched to reduce the frequency at which re-search of a guide route is executed. A navigation device includes an information input unit for acquiring a control condition for controlling the traveling of the vehicle as control characteristic information from an autonomous driving control device, and a route searching unit for searching a guide route for the vehicle satisfying the control condition based on the control characteristic information acquired by the information input unit. Accordingly, the guide route matching with the control characteristic of the vehicle can be searched.

9 Claims, 7 Drawing Sheets

(51) Int. Cl.
- G01C 21/34 (2006.01)
- G01C 21/36 (2006.01)
- B60R 21/00 (2006.01)
- G08G 1/137 (2006.01)
- G09B 29/00 (2006.01)

(52) U.S. Cl.
CPC ............ G05D 1/0088 (2013.01); *B60R 21/00* (2013.01); *B60W 2550/14* (2013.01); *G05D 2201/0213* (2013.01); *G08G 1/137* (2013.01); *G09B 29/00* (2013.01)

(58) Field of Classification Search
USPC .......................................................... 701/25
See application file for complete search history.

(56) References Cited

OTHER PUBLICATIONS

International Preliminary Report on Patentability issued for corresponding PCT/JP2016/061681.
Written Opinion of the International Search Authority issued for corresponding PCT/JP2016/061681.
International Search Report issued for corresponding PCT/JP2016/061681 application.
Written Opinion of the International Search Authority issued for corresponding PCT/JP2016/061681 application.

\* cited by examiner

ROUTE SEARCHING APPARATUS AND ROUTE SEARCHING METHOD

CROSS-REFERENCE TO RELATED APPLICATION

This is the U.S. National Phase under 35 U.S.C. 371 of International Application No. PCT/JP2016/061681, filed on Apr. 11, 2016, which in turn claims the benefit of Japanese Patent Application No. 2015-087022, filed on Apr. 21, 2015, the disclosures of which are incorporated by reference herein.

BACKGROUND OF THE INVENTION

Field of the Invention

The present invention relates to a route searching apparatus and a route searching method.

Description of the Related Art

A device for selecting a traveling route reflecting a driver's driving taste (see Japanese Patent Laid-Open No. 2008-180591, for example) and a device for searching a second destination in place of a specified destination according to a detected surrounding condition around a vehicle when a searched route does not satisfy a predetermined condition (see Japanese Patent Laid-open No. 2008-9913, for example) have been hitherto known as a device for searching a traveling route for a vehicle.

SUMMARY OF THE INVENTION

However, even when a route is searched by a route searching apparatus, there is a case where a vehicle cannot travel along the route due to the characteristic of vehicle control or the like, so that re-search of a route is required. When re-search of a route is performed in the course of route guidance, it causes an occupant of the vehicle discomfort.

The present invention has been implemented in view of the foregoing circumstances, and has an object to provide a route searching apparatus and a route searching method that search a guide route matching with the characteristic of vehicle control, thereby reducing the frequency at which re-search of a guide route is executed.

In order to attain the above object, a route searching apparatus according to the present invention comprises: an information input unit for acquiring information on a control condition for controlling traveling of a vehicle; and a route searching unit for searching a guide route for the vehicle satisfying the control condition based on the information on the control condition acquired by the information input unit.

According to the present invention, the frequency at which re-search of a guide route is executed can be reduced by searching a guide route matching with the characteristic of vehicle control.

According to the present invention, in the above-described route searching apparatus, the information input unit acquires, as the information on the control condition, a permission threshold value that is set for each traveling situation of the vehicle and permits execution of vehicle control corresponding to the traveling situation, and the route searching unit searches a guide route on which the vehicle is permitted to execute the vehicle control based on the permission threshold value.

According to the present invention, a route on which it is possible to execute vehicle control corresponding to a traveling situation can be selected as a guide route. Accordingly, the frequency at which re-search of a route is executed in the course of route guidance can be reduced, and discomfort which an occupant of the vehicle feels can be mitigated.

According to the present invention, in the above-described route searching apparatus, when there is a lane shift as the traveling situation in a searched route, the route searching unit compares a distance as the permission threshold with a road length of a road on which the lane shift is executed, thereby determining whether the searched route is selected as the guide route for the vehicle.

According to the present invention, the frequency of a situation where it is impossible to execute a lane shift in a selected guide route can be reduced, and discomfort which an occupant of the vehicle feels can be mitigated.

According to the present invention, in the above-described route searching apparatus, when there is a lane shift as the traveling situation in a searched route, the route searching unit determines whether the lane shift is a shift within a steering angle range of the vehicle as the permission threshold value, thereby determining whether the searched route is selected as the guide route for the vehicle.

According to the present invention, the frequency of a situation where it is impossible to execute a lane shift in a selected guide route can be reduced, and discomfort which an occupant of the vehicle feels can be mitigated.

According to the present invention, in the above-described route searching apparatus, the information input unit acquires a vehicle width of the vehicle as the information on the control condition, and the route searching unit determines based on the information on the control condition whether a searched route is a route on which the vehicle can travel, thereby determining whether the searched route is selected as the guide route for the vehicle.

According to the present invention, a route containing a road on which the vehicle cannot travel is prevented from being selected as a guide route. Therefore, the frequency at which re-search of a route is executed in the course of route guidance can be reduced, and discomfort which an occupant of the vehicle feels can be mitigated.

According to the present invention, in the above-described route searching apparatus, the information input unit acquires, as the information on the control condition, information representing whether the vehicle can travel at a roundabout, and the route searching unit determines based on the information on the control condition whether the vehicle can travel at a roundabout, thereby determining whether the searched guide route is selected as a route for the vehicle.

According to the present invention, a roundabout at which the vehicle cannot travel is prevented from being selected as a guide route.

According to the present invention, in the above-described route searching apparatus, the vehicle is incorporated with an autonomous driving system for performing driving, braking and steering of the vehicle to make the vehicle travel autonomously, and the route searching apparatus searches a traveling route on which the vehicle can autonomously travel.

A route searching method according to the present invention comprises: a step of acquiring information on a control condition for controlling traveling of a vehicle; and a step of searching a guide route for the vehicle satisfying the control condition based on the acquired information on the control condition.

According to the present invention, the frequency at which re-search of a guide route is executed can be reduced by searching a guide route matching with the characteristic of the vehicle control.

According to the present invention, the frequency at which re-search of a guide route is executed can be reduced by searching a guide route matching with the characteristic of vehicle control.

DETAILED DESCRIPTION OF THE INVENTION

First Embodiment

Figure 1:
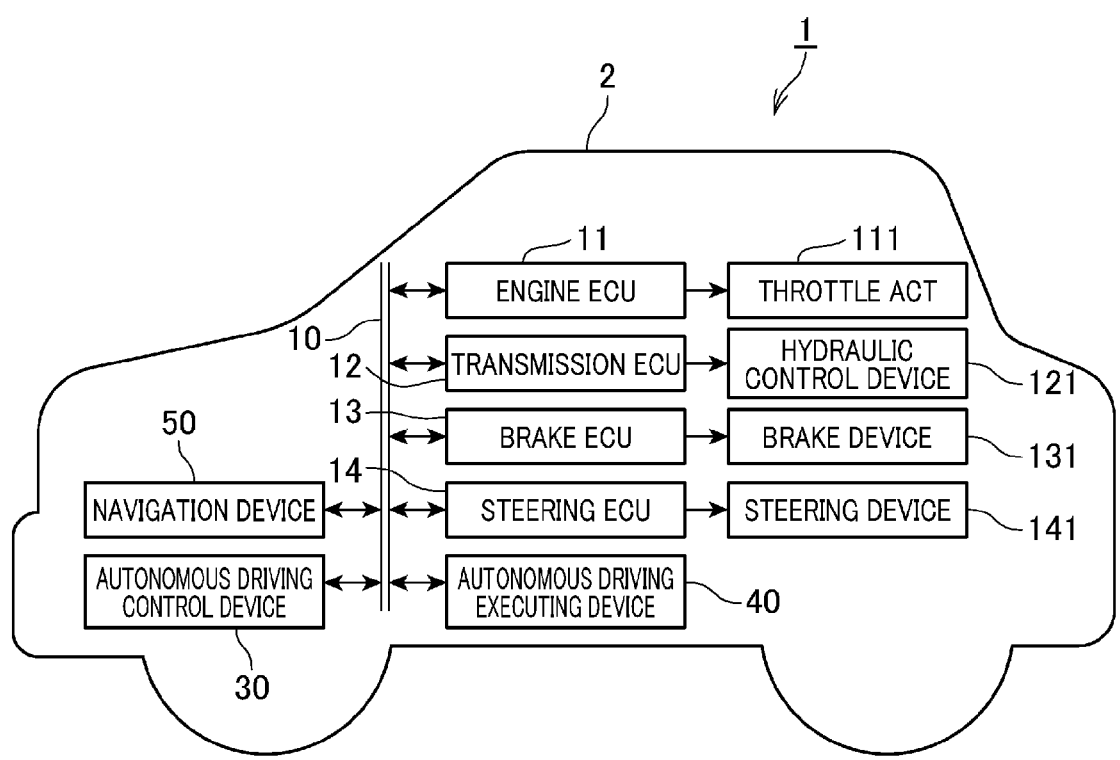
FIG. 1 is a diagram showing a system configuration of an autonomous driving control system of a first embodiment.

An embodiment will be described with reference to the accompanying drawings. FIG. 1 is a diagram showing a system configuration of an autonomous driving control system 1. The autonomous driving control system 1 is mounted on a vehicle 2, and it is a system for autonomously driving a vehicle 2 by performing driving, braking and steering of the vehicle 2 without depending on a driver's driving operation. The vehicle 2 has, as a traveling mode, autonomous driving in which the autonomous driving control system 1 performs the driving, braking and steering of the vehicle 2 so that the vehicle 2 is caused to travel under the control of the autonomous driving control system 1, and manual driving in which the vehicle 2 is caused to travel by an occupant's manual operation of the vehicle 2.

The autonomous driving control system 1 includes an autonomous driving control device 30, an autonomous driving executing device 40, a navigation device 50, an engine ECU (Electronic Control Unit) 11, a transmission ECU 12, a brake ECU 13, and a steering ECU 14. These components are mutually connected to one another so as to be capable of communicating with one another through a bus 10 which meets standards of CAN (Controller Area Network), LIN (Local Interconnect Network), etc.

The autonomous driving control device 30 transmits control data to the autonomous driving executing device 40 to control the autonomous driving executing device 40, and controls the autonomous driving of the vehicle 2. The details of the autonomous driving control device 30 will be described later.

The autonomous driving executing device 40 transmits a control signal to each ECU based on the control data input from the autonomous driving control device 30 to control each ECU, and executes the autonomous driving.

The engine ECU 11 is connected to a throttle actuator 111 for opening/closing an electronic throttle valve provided to an intake pipe of an engine. The engine ECU 11 controls the throttle actuator 111 based on the control signal received from the autonomous driving executing device 40 to adjust the opening/closing degree of the electronic throttle valve so that the number of revolutions of the engine is equal to a target number of revolutions.

A transmission ECU 12 is connected to a hydraulic control device 121 for adjusting the hydraulic pressure of hydraulic oil supplied to a transmission. The transmission ECU 12 controls the hydraulic control device 121 based on a control signal received from the autonomous driving executing device 40, and changes the transmission gear ratio of the transmission by adjusting the hydraulic pressure of the hydraulic oil to be supplied to the transmission, thereby changing the number of revolutions or torque transmitted from the engine.

A brake ECU 13 is connected to the brake device 131. The brake ECU 13 controls the brake device 131 provided to each wheel of the vehicle 2 based on a control signal received from the autonomous driving executing device 40 to perform braking of the vehicle 2.

A steering ECU 14 is connected to the steering device 141. The steering ECU 14 controls the steering device 141 provided to the vehicle 2 based on a control signal received from the autonomous driving executing device 40 to perform steering of the vehicle 2.

The autonomous driving executing device 40 controls the respective ECUs based on control data received from the autonomous driving control device 30 to perform control of start/stop of the vehicle 2, control of acceleration/deceleration of the vehicle 2, control of gear shift of the vehicle 2, control of steering of the vehicle 2 and other control, thereby performing autonomous driving.

The navigation device 50 detects the position of the vehicle based on a GPS signal received from a GPS receiver 511 (see FIG. 2), and displays map data 551 read out from a storage unit 550 (see FIG. 2) on a display panel 541 (see FIG. 2) to perform route guidance to a destination.

Figure 2:
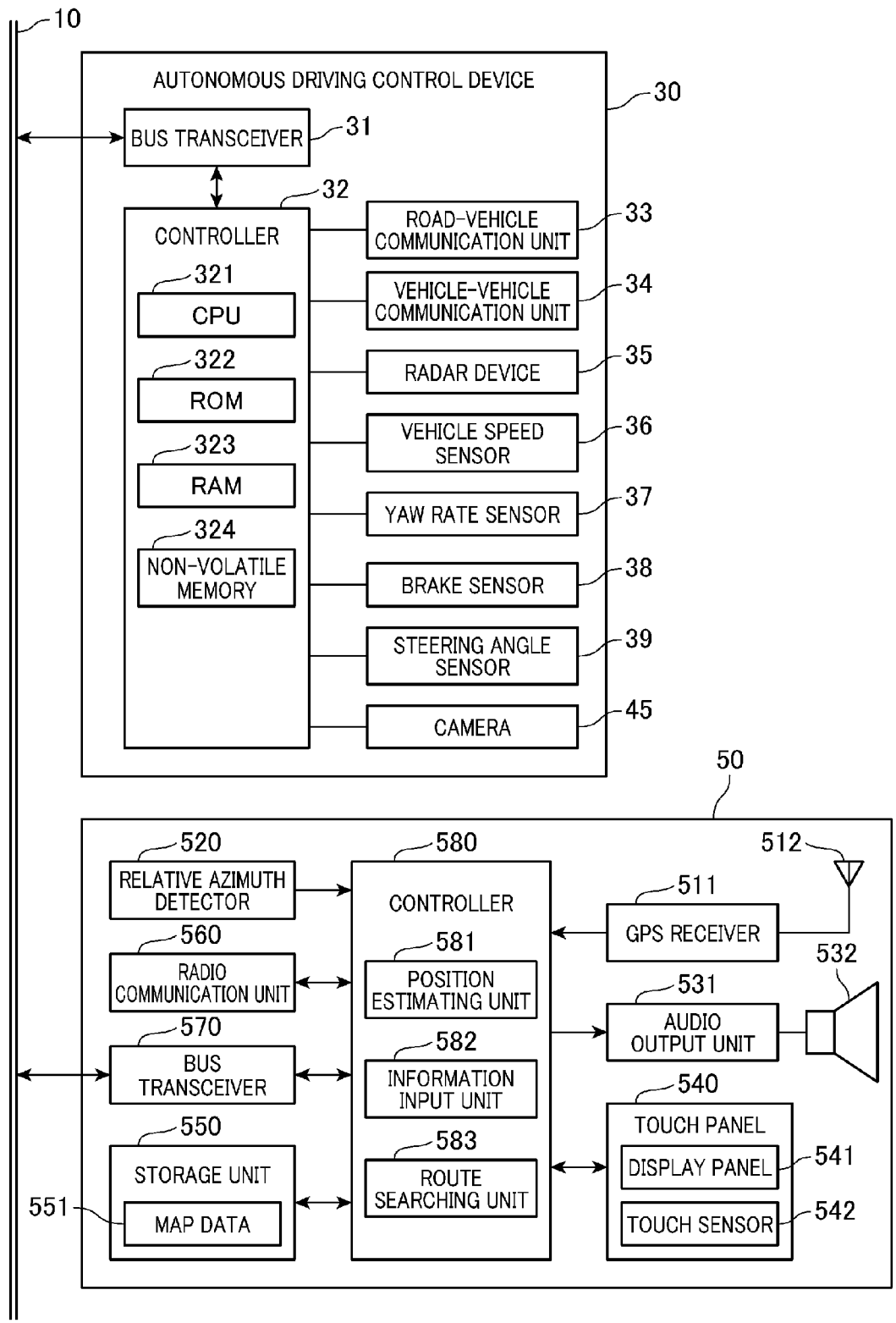
FIG. 2 is a function block diagram of an autonomous driving control device and a navigation device according to the first embodiment.

FIG. 2 is a functional block diagram showing the autonomous driving control device 30 and the navigation device 50.

First, the autonomous driving control device 30 will be described. The autonomous driving control device 30 includes a bus transceiver 31, a controller 32, a road-vehicle communication unit 33, a vehicle-vehicle communication unit 34, a radar device 35, a vehicle speed sensor 36, a yaw rate sensor 37, a brake sensor 38, a steering angle sensor 39 and a camera 45.

The bus transceiver 31 is an IC (Integrated Circuit) for interface with the bus 10. The bus transceiver 31 outputs control data input from the controller 32 to the autonomous driving executing device 40 via the bus 10. The bus transceiver 31 receives position information which is output from the navigation device 50 and represents the current position of the vehicle 2, and information on a guide route, and outputs the input information to the controller 32.

The controller 32 includes CPU 321, ROM 322 in which control programs are stored, and RAM 323 serving as a work memory for CPU 321. CPU 321 performs calculation according to the control programs, and outputs control data as control commands to the autonomous driving executing device 40.

The controller 32 has a non-volatile memory 324. The non-volatile memory 324 stores control characteristic information (control condition) therein. The details of the control characteristic information will be described later.

The road-vehicle communication unit 33 receives information which is transmitted from a roadside device installed at a roadside such as an intersection by narrow-band radio communication such as an optical beacon, a radio beacon, or DSRC (Dedicated Short Range Communications). The information transmitted from the roadside device to the road-vehicle communication unit 33 includes road traffic information containing traffic jam information, etc., and information on pedestrians, etc. The road-vehicle communication unit 33 outputs the received information to the controller 32.

The vehicle-vehicle communication unit 34 mutually communicates vehicle information with peripheral vehicles located around the vehicle 2 via radio communication. The vehicle information contains, for example, identification information for identifying the vehicle 2 and the peripheral vehicles, position information of the vehicle 2 and the peripheral vehicles, information on the speeds of the vehicle 2 and the peripheral vehicles, the travel directions of the vehicle 2 and the peripheral vehicles, etc. The vehicle-vehicle communication unit 34 outputs the received vehicle information to the controller 32.

The radar device 35 irradiates a predetermined range in front of the vehicle with electric waves such as milli-wave radar or laser radar, or sonic waves such as ultrasonic wave radar, for example. The radar device 35 receives reflection waves reflected from an object existing in the predetermined range (for example, a preceding vehicle) to detect information on the object traveling ahead of the vehicle 2. The information detected at this time contains information on the presence or absence of a preceding vehicle, and information on the distance to the preceding vehicle (vehicular gap), an angle (relative position), a speed (relative speed), an acceleration, etc. The radar device 35 outputs the detected information to the controller 32.

The vehicle speed sensor 36 detects the speed of the vehicle 2 (vehicle speed), and outputs a detection signal representing the detected vehicle speed to the controller 32.

The yaw rate sensor 37 detects a yaw rate acting on the vehicle 2, and outputs a detection signal representing the detected yaw rate to the controller 32.

The brake sensor 38 detects the amount of a driver's operation on a brake pedal (step-on amount, angle, pressure, etc.) and outputs a detection signal representing the detected operation amount to the controller 32.

The steering angle sensor 39 detects the steering angle of a steering and outputs a detection signal representing the detected steering angle to the controller 32.

The camera 45 has plural imaging devices, and captures images in the front-and-rear and right-and-left directions of the vehicle 2. The camera 45 performs imaging at a predetermined period (for example, at an interval of 100 ms) according to the control of the controller 32, generates captured image data based on an imaging result and outputs the generated captured image data to the controller 32.

Next, the configuration of the navigation device 50 will be described.

The navigation device 50 includes a GPS receiver 511, a GPS antenna 512, a relative azimuth detector 520, an audio output unit 531, a speaker 532, a touch panel 540, a storage unit 550, a radio communication unit 560, a bus transceiver 570 and a controller 580.

The GPS receiver 511 receives GPS electric waves from a GPS satellite via the GPS antenna 512, and calculates the position coordinate representing the current position of the vehicle 2 and the traveling direction from a GPS signal superimposed on the GPS electric waves. The GPS receiver 511 outputs a calculation result to the controller 580.

The relative azimuth detector 520 has a gyro sensor and an acceleration sensor (both are not shown). The gyro sensor is configured by, for example, a vibration gyro, and detects the relative azimuth (for example, a swing amount in a yaw axis direction) of the vehicle. The acceleration sensor detects an acceleration acting on the vehicle (for example, the inclination of the vehicle with respect to the traveling direction). The relative azimuth detector 520 outputs a detection result to the controller 580.

The audio output unit 531 has a D/A converter, an amplifier, etc. (not shown), subjects an audio data signal for route guidance output from the controller 580 to digital/analog conversion and amplification by the amplifier, and outputs sounds into a vehicle interior from the speaker 532.

The touch panel 540 has a display panel 541 and a touch sensor 542. The display panel 541 is configured by a liquid crystal display, an EL (Electro Luminescent) display or the like, and displays various kinds of information under the control of the controller 580. The touch sensor 542 is arranged to be superimposed on the display panel 541, and it detects a user's touch operation and outputs the detection result to the controller 580.

The storage unit 550 has a non-volatile storage device such as a hard disc or EEPROM, and rewritably stores data. The storage unit 550 stores map data 551 as well as the control programs. The map data 551 has information on nodes representing intersections and other nodal points on a road network, information on links representing road sections between nodes, and information on the names of administrative divisions, roads, facilities, intersections, etc. on a map.

The radio communication unit 560 accesses a network such as the Internet in conformity to a predetermined telecommunications standard under the control of the controller 580, and communicates with external equipment connected to the network. The external equipment contains a server for providing road traffic information, and the radio communication unit 560 is connected to the network to acquire the road traffic information from the server.

The bus transceiver 570 is connected to the bus 10. The bus transceiver 570 is an IC (Integrated Circuit) for interface with the bus 10. The bus transceiver 570 outputs route guidance information generated by the controller 580 and position information representing the current position of the vehicle 2 to the autonomous driving control device 30. The bus transceiver 570 receives data output from the other ECUs and sensors via the bus 10, and outputs these data to the controller 580.

The controller 580 has hardware such as CPU, ROM, RAM (all are not shown), and controls the respective components of the navigation device 50. The controller 580 executes the control programs stored in ROM, etc. to function as a position estimating unit 581, an information input unit 582 and a route searching unit 583.

The position estimating unit 581 specifies the current position of the vehicle 2. The position estimating unit 581 receives information representing the position coordinate and the traveling direction input from the GPS receiver 511, relative azimuth information of the vehicle 2 input from the relative azimuth detector 520, and information contained in the map data 551 stored in the storage unit 550. The position estimating unit 581 may be configured so as to receive a detection signal representing the vehicle speed measured by the vehicle speed sensor 36, a detection signal representing the steering angle measured by the steering angle sensor 39, a detection signal representing the operation amount of the brake measured by the brake sensor 38, a detection signal representing the yaw rate measured by the yaw rate sensor 37, etc. from the autonomous driving control device 30 via the bus 10. The position estimating unit 581 specifies the current position of the vehicle 2 based on these input information.

Specifically, the position estimating unit 581 estimates the moving speed, moving direction, etc. of the vehicle 2 based on the information input from the various kinds of sensors such as the relative azimuth detector 520, and information contained in the map data 551 as the occasion demands. On the basis of the estimated moving speed, moving direction, etc., the position estimating unit 581 corrects the current position of the vehicle 2 calculated based on the input from the GPS receiver 511, thereby specifying the current position.

The position estimating unit 581 may be configured so as to specify the current position of the vehicle 2 by using a signal from a positioning satellite system such as GLONASS, Galileo, Beidou, or QZSS (michibiki) in combination with a GPS signal.

The information input unit 582 communicates with the autonomous driving control device 30 to transmit an acquisition request for the control characteristic information, for example, upon start-up of the controller 580 or every preset period. Upon input of the acquisition request from the navigation device 50, the autonomous driving control device 30 reads out the control characteristic information stored in the non-volatile memory 324 and transmits the read-out control characteristic information to the navigation device 50.

The control characteristic information contains information representing the characteristic of the vehicle itself and information on the autonomous driving control which are used when the autonomous driving control device 30 controls the autonomous driving of the vehicle 2. For example, the control characteristic information contains the following information:
(1) the threshold value of the distance which permits execution of vehicle control under each driving situation;
(2) the range of the vehicle speed (highest speed and lowest speed) which permits execution of vehicle control under each driving situation;
(3) the range of the steering angle which permits execution of vehicle control under each driving situation;
(4) the safety margin under each driving situation;
(5) the vehicle height and vehicle width of the vehicle; and
(6) the types of roads that are not suitable for autonomous driving.

The driving situation contains, for example, a lane shift to prepare for branching at a branch point, U-turn, right-turning/left-turning, etc. For example, when the driving situation is the lane shift, the threshold value of the distance which permits execution of vehicle control (permission threshold value) corresponds to a threshold value of the distance to a branch point which is required for the lane shift. Furthermore, when the driving situation is the lane shift, the range of the vehicle speed which permits execution of vehicle control (permission threshold value) corresponds to the range of a vehicle speed which is required for safely performing the lane shift.

Each automobile maker uniquely sets the distance and the vehicle speed for permitting the lane shift in the autonomous driving based on a safety standard for the autonomous driving of each company.

Therefore, even in a case where a route for guidance is searched by the navigation device 50, the autonomous driving control device 30 does not instruct the autonomous driving executing device 40 to execute the lane shift when the road length permitted for the lane shift is shorter than the threshold value of the distance set as the control characteristic information or the vehicle speed under the lane shift is not within the vehicle speed range set as the control characteristic information. Therefore, a route re-search is performed by the navigation device 50 in the course of the route for guidance, so that the vehicle travels a long way round. In addition, the vehicle travels along a route different from the route guided by the navigation device 50, which makes an occupant feel discomfort.

Therefore, the route searching unit 583 acquires the threshold value of the distance and the vehicle speed range which permit the lane shift and are input from the information input unit 582, and selects a guide route for guiding the vehicle 2 based on the acquired threshold value of the distance and the vehicle speed range. That is, the route searching unit 583 searches a guide route that satisfies the conditions of the threshold value of the distance and the vehicle speed range for permitting the lane shift (that is, satisfies the control condition). Specifically, the autonomous driving control device 30 selects, as a guide route, a road on which the distance for permitting the lane shift is longer than the threshold value of the distance and/or a vehicle speed higher than the lowest vehicle speed for permitting the lane shift can be achieved. Furthermore, the autonomous driving control device 30 does not select, as a guide route, a road on which the distance for permitting the shift lane is equal to or less than the threshold value of the distance, or a road on which the lowest vehicle speed for permitting the lane shift cannot be achieved because the distance after right-turn or left-turn is short. As a result, there can be reduced occurrence of such a situation that no lane shift is executed and re-research of a guide route is executed when the vehicle 2 is caused to perform autonomous driving according to a guide route selected by the autonomous driving control device 30.

The steering angle range (permission threshold value) which is acquired from the autonomous driving control device 30 by the information input unit 582 is information on the maximum and minimum values of the steering angle which are set for each driving situation. The steering angle range (particularly, the maximum value) varies according to the vehicle 2. With respect to a road on which it is required to perform U-turn, right-turn/left-turn or a lane shift at an angle larger than the maximum value of the steering angle set as the control characteristic information in a guide route searched by the navigation device 50, the autonomous driving control device 30 does not instruct the autonomous driving executing device 40 to perform U-turn, right-turn/left-turn or lane shift.

Therefore, the route searching unit 583 selects a guide route for guiding the vehicle 2 based on the range of the steering angle input from the information input unit 582. That is, the route searching unit 583 searches a guide route satisfying the steering angle range which permits U-turn, right-turn/left-turn and a lane shift (that is, satisfying the control condition). Specifically, the route searching unit 583 does not select any road on which U-turn, right-turn/left-turn or a lane shift must be performed at an angle larger than the maximum value of the steering angle set as the control characteristic information. Accordingly, there can be reduced occurrence of such a situation that re-search of a guide route is performed without performing U-turn, right-turn or lane shift when the vehicle 2 is caused to perform autonomous driving according to the guide route selected by the autonomous driving control device 30.

The safety margin acquired from the autonomous driving control device 30 by the information input unit 582 is an operation vouching distance for preventing the occupant from being discomforted.

For example, when a vehicle stopping at a traffic signal ahead of the vehicle 2 on the traffic lane is detected while the vehicle 2 travels under the autonomous driving control of the autonomous driving control device 30, the autonomous driving control device 30 instructs the brake ECU 13 to stop the vehicle 2 at a distance obtained by adding a vehicular gap set by an automobile maker with a distance set as a safety margin. In the case where the driving situation is the lane shift, the autonomous driving control device 30 does not permit execution of the lane shift when neither the distance between the vehicle 2 and a preceding vehicle to the vehicle 2 nor the distance between the vehicle 2 and a following vehicle to the vehicle 2 on a new lane after the lane shift reaches the distance obtained by adding the safety margin to the vehicular gap set by the automobile maker.

Furthermore, the safety margin can be set for each speed zone such as a low speed zone, a middle speed zone and a high speed zone. For example, when the vehicle 2 travels at a vehicle speed in the low speed zone, the autonomous driving control device 30 controls the vehicle 2 so that the vehicular gap between the vehicle 2 and the preceding vehicle is equal to 5 m or more, and when the vehicle 2 travels in the high speed zone, the autonomous driving control device 30 controls the vehicle 2 so that the vehicle gap between the vehicle 2 and the preceding vehicle is equal to 10 m or more.

The route searching unit 583 receives information on the vehicle height and vehicle width of the vehicle 2 which the information input unit 582 acquires from the autonomous driving control device 30. Based on the input information on the vehicle height and vehicle width of the vehicle 2, the route searching unit 583 is configured not to select, as a guide route and a search result of a destination search, a road on which the vehicle 2 cannot travel and a parking place which the vehicle 2 cannot enter.

Furthermore, the route searching unit 583 receives information on the road types which the information input unit 582 acquires from the autonomous driving control device 30 and are not suitable for the autonomous driving. Based on the input information on the road types, the route searching unit 583 is configured not to select, as a guide route, road types which are not suitable for the autonomous driving (for example, roundabout (Roundabout) or the like).

When the vehicle 2 is planned to execute the traveling based on the autonomous driving, the route searching unit 583 is configured not to select the following roads as a guide route in addition to the control characteristic information acquired from the autonomous driving control device 30.

When the traveling based on the autonomous driving is planned, the route searching unit 583 is configured not to select, as a guide route, a narrow street whose road condition is apt to be complicated.

Furthermore, when the traveling based on the autonomous driving is planned, the route searching unit 583 is configured not to select, as a guide route, a road on which a traffic jam has occurred at a place where confluence is necessary.

When the traveling based on the autonomous driving is planned, the route searching unit 583 is configured not to select, as a guide route, a road on which it is difficult to specify a lane for traveling because the number of lanes is large.

When the traveling based on the autonomous driving is planned, the route searching unit 583 is configured not to select, as a guide route, a road on which it is necessary to communicate with occupants of peripheral vehicles traveling around the vehicle 2, for example, a road on which no traffic signal is installed.

Furthermore, when the traveling based on the autonomous driving is planned, the controller 580 acquires information on a road having no lane marking or a road having a partially missing lane marking from a server as an external device via the radio communication unit 560, for example. Based on the acquired information, the route searching unit 583 is configured not to select, as a guide route, a road on which sufficient maintenance is not executed, such as a road having no lane marking, or a road having a partially missing lane marking.

Furthermore, when the traveling based on the autonomous driving is planned, the controller 580 acquires, from a server as an external device via the radio communication unit 560, information on a place where the road shape has been changed due to a construction or the like, for example. The route searching unit 583 is configured not to select, as a guide route, a route containing a place where the road shape has been changed due to a construction or the like. With respect to the road whose road shape has been changed, LDM (Local Dynamic Map) has been also changed, and thus there is a case where it is impossible to specify the current position of the vehicle 2 using LDM. Therefore, a route containing a place where the road shape has been changed due to a construction or the like is prevented from being selected as a guide route.

In addition to the foregoing information (1) to (6), for example, information on the number of cameras 45 mounted on the vehicle 2 and the mounting positions of the cameras 45 may be acquired from the autonomous driving control device 30.

When the route searching unit 583 determines based on the information on the mounting positions of the cameras 45 and the number of mounted cameras 45 that the traveling based on the autonomous driving on a street is possible although the street is narrow, a route containing the narrow street is selected as a guide route.

When a guide route is calculated by the route searching unit 583, the controller 580 transmits the information on the calculated guide route, the road traffic information acquired from the road-vehicle communication unit 33 and the map data 551 of the guide route to the autonomous driving control device 30.

When the traveling mode of the vehicle 2 is set to the autonomous driving and the information on the guide route, the road traffic information and the map data 551 of the guide route are input from the navigation device 50, the autonomous driving control device 30 generates control data based on the input information. The autonomous driving control device 30 outputs the generated control data to the autonomous driving executing device 40, and causes the autonomous driving executing device 40 to execute the autonomous driving. The control data contains control information on the autonomous traveling control of the vehicle 2 such as control information on control of start/stop of the vehicle 2, control information on control of acceleration/deceleration of the vehicle 2, control information on control of gear shifting of the vehicle 2, and control information on control of the steering of the vehicle 2.

During traveling on a guide route, the autonomous driving control device 30 generates a target speed pattern and a target traveling pattern for the traveling on the guide route. The guide route is segmented into sections under a predetermined condition, and the target speed pattern corresponds to target values of the speed in the respective segmented sections. The target traveling pattern is information on acceleration, coasting (the vehicle 2 is caused to travel by the inertia of the vehicle 2) and braking in each section to be controlled so that the speed of the vehicle 2 in the section is equal to a speed set in the target speed pattern.

The autonomous driving control device 30 generates control data for controlling the autonomous driving so that the vehicle 2 travels in accordance with the generated target speed pattern and the target traveling pattern. That is, the autonomous driving control device 30 generates control data containing control information for starting/stopping and steering the vehicle 2 so that the vehicle 2 travels in accordance with the target traveling pattern and also accelerating/decelerating and gear-changing the vehicle 2 so that the speed matches with the target speed pattern.

During the traveling based on the autonomous driving, the controller 32 performs the following processing.

Based on inputs from the vehicle speed sensor 36, the steering angle sensor 39, the brake sensor 38 and the yaw rate sensor 37, the controller 32 detects the traveling state of the vehicle 2 and corrects the target speed pattern and the target traveling pattern according to the traveling state of the vehicle 2. Furthermore, based on vehicle information input from the vehicle-vehicle communication unit 34, the controller 32 corrects the target speed pattern and the target traveling pattern according to the relationship with vehicles located around the vehicle 2. Still furthermore, based on information input from the road-vehicle communication unit 33 and captured image data input from the camera 45, the controller 32 acquires information on the environment around the vehicle 2 such as the presence or absence of congestion, the state of traffic signals, the presence or absence of pedestrians, and corrects the target speed pattern and the target traveling pattern according to the environment around the vehicle 2. Based on information input from the radar device 35, the autonomous driving control device 30 corrects the target speed pattern and the target traveling pattern according to the distance to a preceding vehicle. The autonomous driving control device 30 generates control data based on the corrected target speed pattern and the corrected target traveling pattern.

The autonomous driving control device 30 outputs the generated control data to the autonomous driving executing device 40. The autonomous driving executing device 40 controls the respective ECUs such as the engine ECU 11 based on the input control data. As a result, the vehicle 2 travels autonomously according to the properly corrected target speed pattern and target traveling pattern, thereby performing the traveling on the autonomous driving route based on the autonomous driving.

Figure 3:
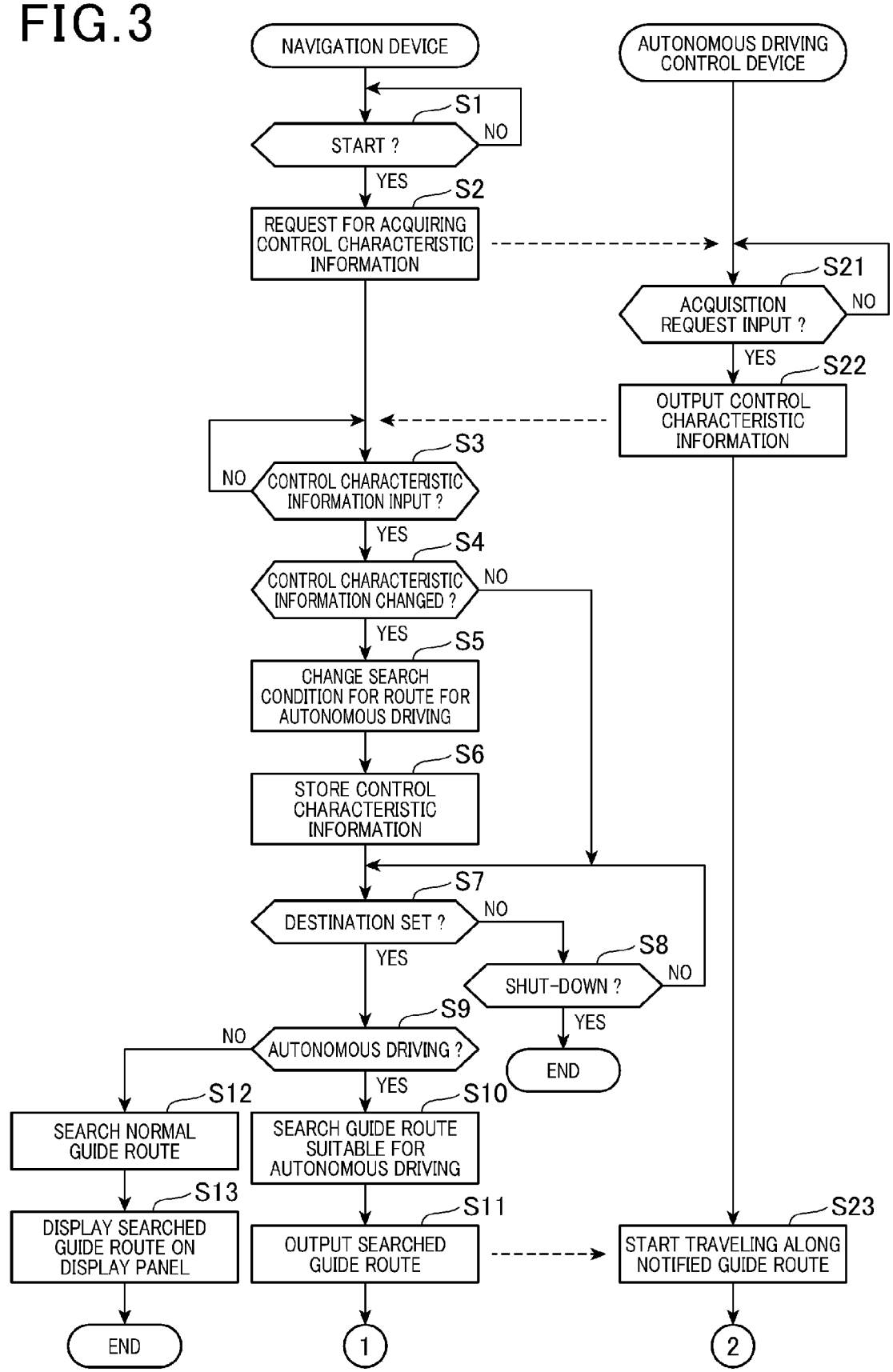
FIG. 3 is a flowchart showing the operations of the navigation device and the autonomous driving control device.
Figure 4:
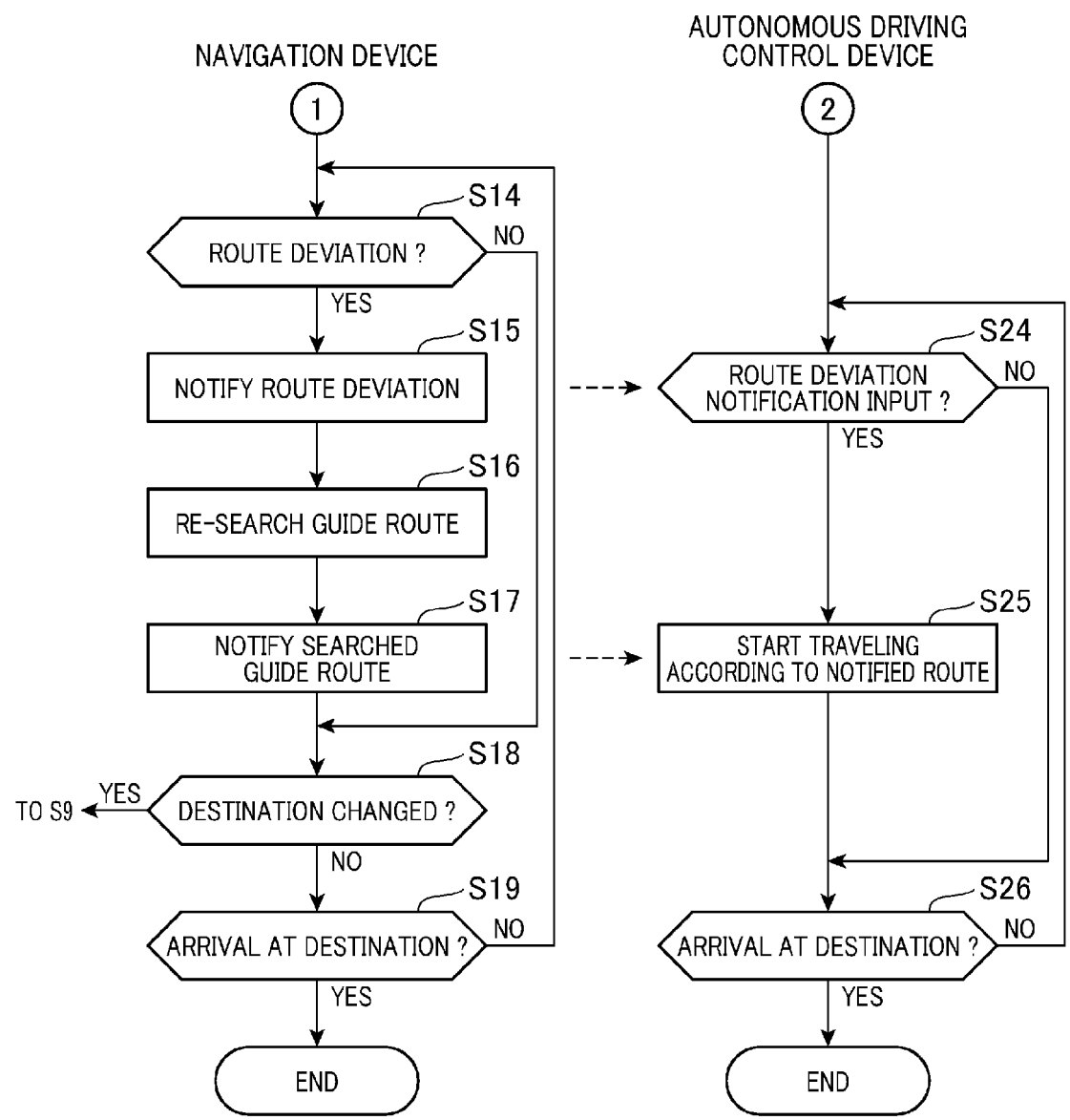
FIG. 4 is a flowchart showing the operations of the navigation device and the autonomous driving control device.

FIGS. 3 and 4 are flowcharts showing the operations of the navigation device 50 and the autonomous driving control device 30. The operations of the navigation device 50 and the autonomous driving control device 30 will be described with reference to FIGS. 3 and 4.

When the navigation device 50 is powered on and started up (step S1/YES), the navigation device 50 outputs an acquisition request for control characteristic information to the autonomous driving control device 30 via the bus 10 (step S2). The autonomous driving control device 30 which receives the acquisition request for control characteristic information (step S21/YES) reads out the control characteristic information stored in the non-volatile memory 324, and outputs the read-out control characteristic information to the navigation device 50 via the bus 10 (step S22).

Upon input of the control characteristic information (step S3/YES), the navigation device 50 determines whether there is any change in the input control characteristic information (step S4). That is, the navigation device 50 determines whether the vehicle incorporated with the navigation device 50 has been changed or not. When determining that there is no change in the control characteristic information (step S4/N0), the navigation device 50 shifts to determination of step S7. On the other hand, when determining that there is some change in the control characteristic information of the vehicle 2 (step S4/YES), the navigation device 50 changes the search condition of a route for autonomous driving based on the input control characteristic information (step S5). When a route for autonomous driving is searched, the navigation device 50 selects a route satisfying the search condition as a guide route.

The navigation device 50 sets, as the search condition for the route for autonomous driving, the threshold value of the distance, the lowest vehicle speed and the highest vehicle speed, the maximum value and minimum value of the steering angle, the safety margin, the vehicle height and the vehicle width, road types which are not suitable for autonomous driving, etc. which are contained in the control characteristic information.

For example, when a road on which a lane shift to prepare for branching at a branch point is necessary exists in a route searched by route search, the navigation device 50 compares the traveling distance to the branch point on the road with the threshold value of the distance as the search condition. When the traveling distance to the branch point is shorter than the threshold value of the distance, the navigation device 50 excludes this road from the guide route, and searches another route. When the traveling distance to the branch point is longer than the threshold value of the distance, the navigation device 50 selects this road as a guide route.

When a road on which a lane shift to prepare for branching at a branch point is necessary exists in a searched route, the navigation device 50 estimates the vehicle speed for executing the lane shift based on the traveling distance to the branch point on the road, and compares the estimated vehicle speed with the lowest vehicle speed as the search condition. When the estimated vehicle speed is lower than the lowest vehicle speed, the navigation device 50 excludes this road from the guide route, and searches another route. On the other hand, when the estimated vehicle speed is higher than the lowest vehicle speed, the navigation device 50 selects this road as a guide route.

In addition, the navigation device 50 searches a guide route based on conditions such as road types that are not suitable for the vehicle height, the vehicle width and the autonomous driving.

Next, the navigation device 50 stores the control characteristic information in a non-volatile memory (not shown) (step S6), and is on standby until a destination is set. When the navigation device 50 is powered off before setting of a destination is input (step S8/YES), the navigation device 50 finishes this processing flow. When setting of a destination is accepted by a touch panel 540 (step S7/YES), the navigation device 50 inquires of the autonomous driving control device 30 whether the traveling mode of the vehicle 2 is set to the autonomous driving, for example. When it is determined that the traveling mode of the vehicle 2 is the autonomous driving (step S9/YES), the navigation device 50 searches a guide route suitable for the autonomous driving based on the search condition for the autonomous driving (step S10). The navigation device 50 outputs the information on the searched guide route, the road traffic information and the map data 551 containing the guide route to the autonomous driving control device 30 (step S11).

The autonomous driving control device 30 generates a target speed pattern and a target traveling pattern for the traveling on the guide route based on the information on the guide route and the map data 551 containing the guide route. The autonomous driving control device 30 generates control data for controlling the autonomous driving so that the vehicle 2 travels in accordance with the generated target speed pattern and target traveling pattern, and outputs the generated control data to the autonomous driving executing device 40. The autonomous driving executing device 40 controls each ECU mounted in the vehicle 2 according to the control data, whereby the traveling based on the autonomous driving according to the guide route is started (step S23).

Furthermore, the autonomous driving control device 30 determines the degree of congestion on a currently-traveling road based on the road traffic information acquired from the navigation device 50. The autonomous driving control device 30 changes the vehicular gap according to the degree of congestion on the road during execution of the autonomous driving. For example, the autonomous driving control device 30 generates control data for controlling each component of the vehicle 2 so that the vehicular gap in the case where the road is congested is shorter than the vehicular gap in the case where the road is not congested, and outputs the generated control data to the autonomous driving executing device 40. In the autonomous driving, when the vehicular gap is the same between the case where the road is congested and the case where the road is not congested, the difference from the manual driving becomes great, and traveling becomes unnatural. However, by changing the vehicular gap according to the congestion condition on the road, the traveling can be made closer to that of the manual driving and more natural.

Furthermore, when determining based on the information input from the autonomous driving control device 30 that the traveling mode of the vehicle 2 is the manual driving (step S9/N0), the navigation device 50 does not use any search condition for autonomous driving, and searches a normal guide route according to a normal search condition (step S12). When a guide route is searched according to the normal search condition, the navigation device 50 displays the searched guide route on the display panel 541 (step S13). Thereafter, the navigation device 50 performs a generally-known normal navigation operation. When the vehicle 2 travels on a road deviating from the guide route, re-search of a guide route is performed. The details of this operation are omitted.

FIG. 4 is a processing flow showing a case where the traveling mode of the vehicle 2 is the autonomous driving and the vehicle 2 starts traveling according to a guide route searched based on a search condition for the autonomous driving.

The position estimating unit 581 of the navigation device 50 estimates the current position of the vehicle 2 based on information input from each sensor and information input from the GPS receiver 511. When determining a deviation from the guide route based on the estimated current position of the vehicle 2 (step S14/YES), the navigation device 50 notifies the deviation from the guide route to the autonomous driving control device 30 (step S15). When the deviation from the guide route is notified from the navigation device 50 (step S24/YES), the autonomous driving control device 30 may still maintain the traveling state, or may shift the vehicle 2 within a fixed range so as to prevent the vehicle 2 from excessively deviating from the guide route. When the vehicle 2 deviates from the guide route, the autonomous driving control device 30 notifies a cause for the deviation from the guide route to the navigation device 50.

Figure 5:
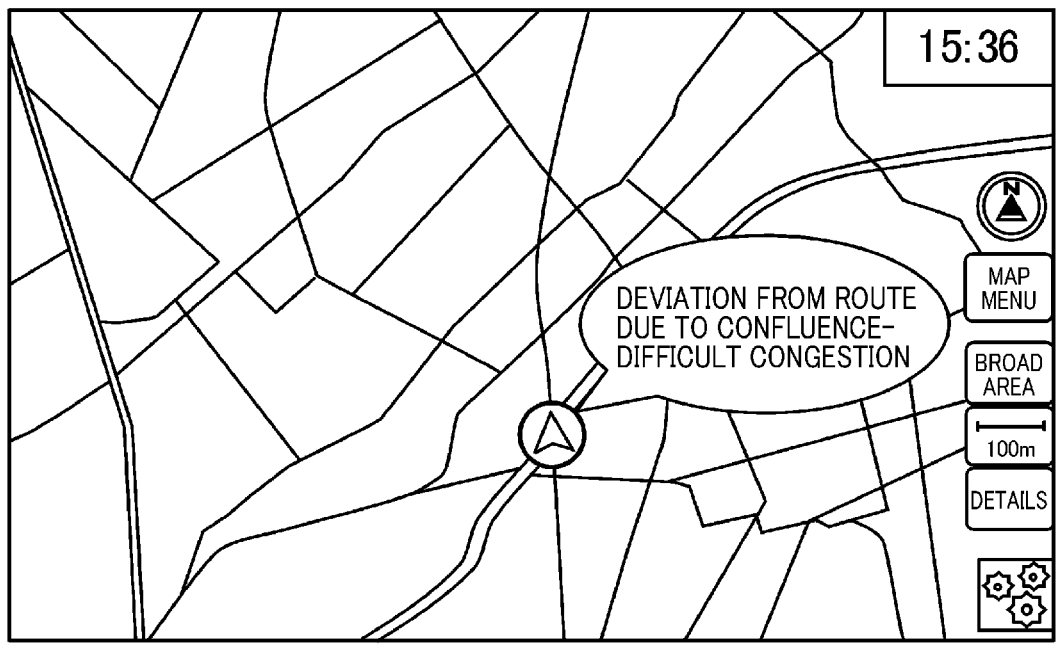
FIG. 5 shows a display example on a display panel.

The navigation device 50 displays, on the display panel 541, the cause for the deviation from the guide route which is notified from the autonomous driving control device 30. FIG. 5 is a diagram showing an example of the cause displayed on the display panel 541. By displaying the cause for the deviation from the guide route on the display panel 541 as described above, it can be notified to the occupant why the autonomous traveling has not been executed according to the guide route, thereby mitigating discomfort which the occupant feels. When the deviation from the route is not caused by a system error of the autonomous driving control system 1, but occurs in a normal operation, the trust of the occupant can be earned.

When detecting the deviation from the guide route, the navigation device 50 re-searches a guide route (step S16). The navigation device 50 re-searches a guide route suitable for the autonomous driving based on the search condition for autonomous driving set in step S5 (step S16). When the guide route is re-searched, the autonomous driving control device 30 notifies the searched guide route to the navigation device 50 (step S17). The autonomous driving control device 30 starts traveling according to the guide route notified from the navigation device 50 (step S25).

When it is determined in the determination of step S14 that no deviation from the guide route occurs (step S14/NO) or a new guide route is notified to the autonomous driving control device 30 in step S17, the navigation device 50 determines whether setting of a destination is changed or not (step S18). When the change of the destination is accepted by the touch panel 540 (step S18/YES), the navigation device 50 shifts to step S9 shown in FIG. 3 to perform the processing from step S9 again.

When the setting of the destination is not changed (step S18/N0), the navigation device 50 determines based on the current position of the vehicle 2 estimated by the position estimating unit 581 whether the vehicle 2 has reached the destination. When determining that the vehicle 2 has not reached the destination (step S19/N0), the navigation device 50 returns to step S14 to perform the processing from step S14 again. When determining that the vehicle 2 has reached the destination (step S19/YES), the navigation device 50 finishes this processing. When the autonomous driving control device 30 determines based on the guide route or the like that the vehicle 2 has reached the destination (step S26/YES), the autonomous driving control device 30 finishes this processing.

As described above, the navigation device 50 according to the first embodiment has the information input unit 582 and the route searching unit 583. The information input unit 582 acquires the control characteristic information as the information on the control condition for controlling the traveling of the vehicle 2 from the autonomous driving control device 30. The route searching unit 583 searches a guide route for the vehicle 2 which satisfies the control condition, based on the control characteristic information acquired by the information input unit 582. Accordingly, a guide route matching with the vehicle control characteristic is searched, and the frequency at which re-search of a guide route is executed can be reduced.

The information input unit 582 receives, as the control condition information, the permission threshold value which is set for each traveling situation of the vehicle 2 and permits execution of the vehicle control corresponding to the traveling situation. Based on the permission threshold value, the route searching unit 583 searches a guide route for which the vehicle 2 is permitted to execute the vehicle control. Accordingly, a route on which execution of the vehicle control corresponding to the traveling situation is possible can be selected as a guide route. Therefore, the frequency at which re-search of a route is performed in the course of route guidance can be reduced, and discomfort which the occupant of the vehicle feels can be mitigated.

When there is a lane shift as a traveling situation on a searched route, the route searching unit 583 compares the distance as the permission threshold value with the road length of a road on which lane shift is performed, and determines whether the searched route is selected as a guide route for the vehicle 2. Accordingly, the frequency of the situation that the lane shift is impossible on the selected guide route can be reduced, and the discomfort which the occupant of the vehicle feels can be mitigated.

Furthermore, when there is a lane shift as a traveling situation on a searched route, the route searching unit 583 determines whether the lane shift is performed within the steering angle range of the vehicle 2 as the permission threshold value, and determines whether the searched route is selected as a guide route for the vehicle 2. Accordingly, the frequency of the situation that the lane shift is impossible on the selected guide route can be reduced, and discomfort which the occupant of the vehicle 2 feels can be mitigated.

The information input unit 582 receives the vehicle width of the vehicle 2 as the control characteristic information. Based on the control characteristic information, the route searching unit 583 determines whether the searched route is a route on which the vehicle 2 can travel, and determines whether the searched route is selected as a guide route for the vehicle 2. Accordingly, a route containing a road on which the vehicle 2 cannot travel can be prevented from being selected as a guide route in the selected guide route. Therefore, the frequency at which re-search of a route is performed in the course of route guidance can be reduced, and discomfort which the occupant of the vehicle 2 feels can be mitigated.

The information input unit 582 receives, as the control characteristic information, information representing whether the vehicle 2 can travel at a roundabout. The route searching unit 583 determines based on the control characteristic information whether the vehicle 2 can travel at a roundabout, and determines whether the searched guide route is selected as a route for the vehicle 2. Accordingly, a roundabout at which the vehicle 2 cannot travel can be prevented from being selected as a guide route.

Second Embodiment

Figure 6:
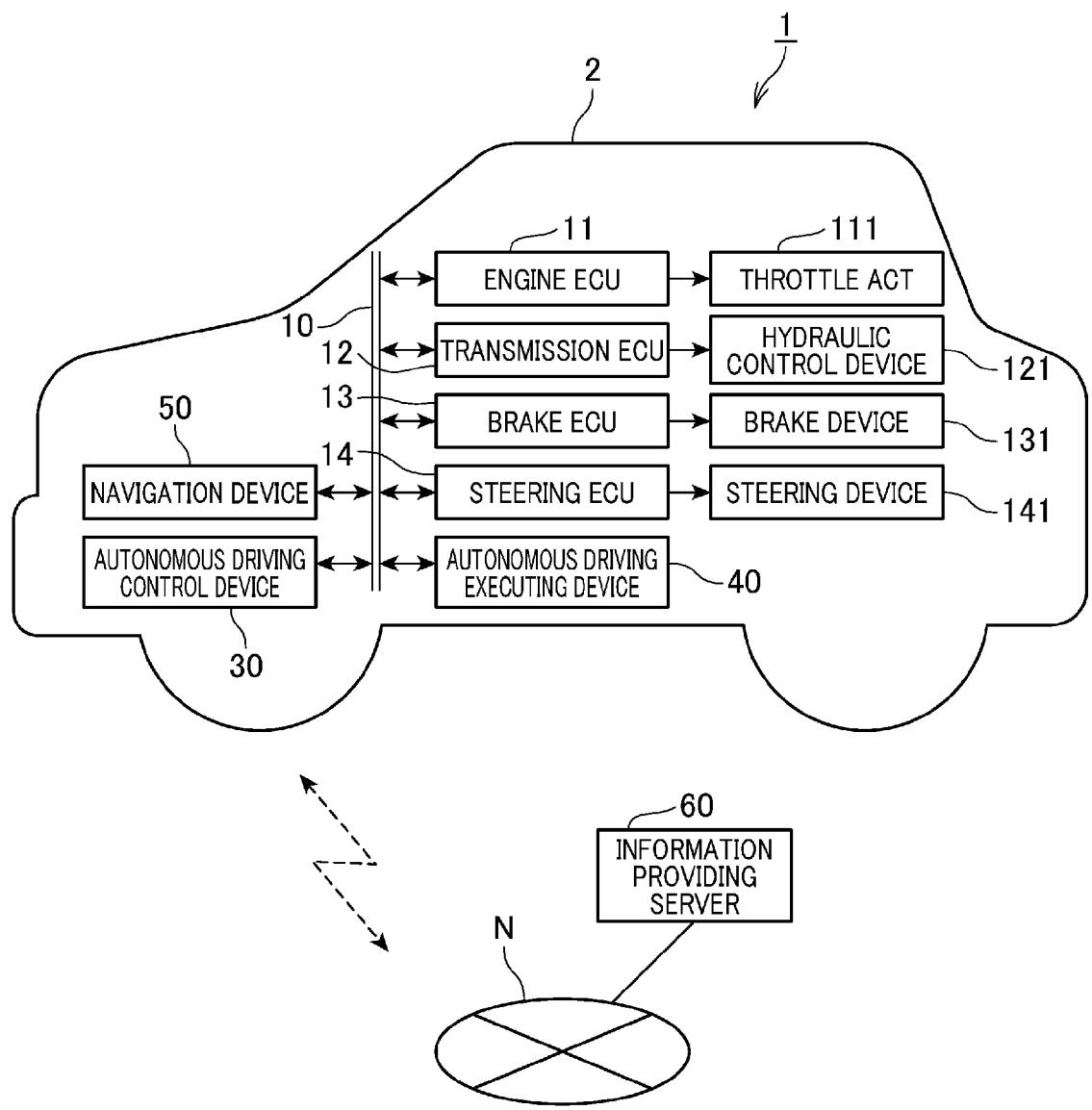
FIG. 6 is a diagram showing a system configuration of an autonomous driving control system according to a second embodiment.

FIG. 6 is a block diagram showing the configuration of the embodiment.

The second embodiment is an embodiment in which the search of the guide route is performed by an information providing server 60 connected to a network N such as the Internet.

Upon input of setting of a destination by the touch panel 540, the navigation device 50 of the vehicle 2 is connected to the network N by the radio communication unit 560 to transmit the setting of the destination and the control characteristic information of the vehicle 2 to the information providing server 60. The information providing server 60 searches a guide route based on the setting of the destination and the control characteristic information of the vehicle 2 which are input from the navigation device 50.

When a guide route is searched, the information providing server 60 simultaneously searches a bypass road for a route which is predicted to deviate due to a factor such as a traffic jam under the autonomous driving.

The information providing server 60 collects, from the navigation device 50 mounted in each vehicle 2, information on a point and a time where a deviation occurs under the autonomous driving, and stores the collected information in a storage unit (not shown). When the searched guide route contains a point where a route deviation may occur with high probability and a predicted time at which this point will be passed is within a time zone where the frequency of route deviation is high, the information providing server 60 also searches information on a bypass road bypassing this point. The information providing server 60 transmits the searched guide route and the information on the bypass road to the navigation device 50 which received the acquisition request.

The above-described embodiments are examples illustrative of one aspect of the present invention, and any modification and application may be arbitrarily made without departing from the subject matter of the present invention.

Figure 7:
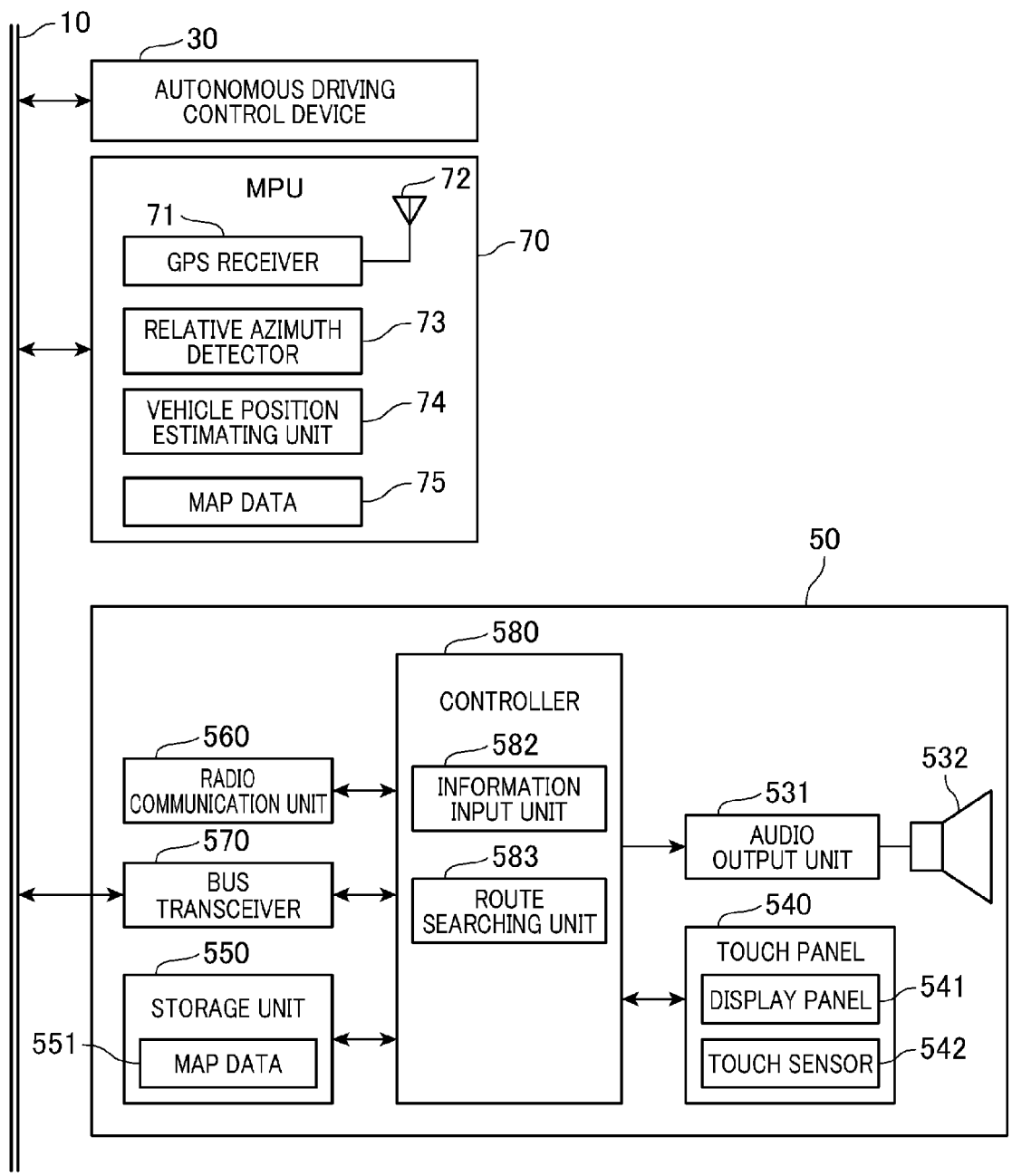
FIG. 7 is a diagram showing another configuration of the autonomous driving control system.

For example, the embodiments may be configured so that MPU (Map Position Unit) 70 including a GPS receiver 71, a GPS antenna 72, a relative azimuth detector 73, an vehicle position estimating unit 74, a map data 75, etc. is provided separately from the navigation device 50 as shown in FIG. 7 and the vehicle position of the vehicle 2 is specified by MPU 70.

The foregoing first and second embodiments have been described while targeting the vehicle 2 which is incorporated with the autonomous driving control device 30 and the autonomous driving executing device 40 and travels in the autonomous driving under the control of the autonomous driving control device 30. However, these embodiments may be applied to a vehicle which travels by a driver's manual operation. The navigation device 50 acquires the information on the vehicle height, vehicle width, etc. from the vehicle 2, and searches, based on the acquired information, a guide route along which the vehicle 2 can travel. Furthermore, the navigation device 50 may acquire information on the degree of driving skill as characteristic information from a driver, and search a guide route based on the acquired characteristic information.

Furthermore, the functional blocks of the autonomous driving control device 30 and the navigation device 50 shown in FIG. 2 are illustrated as a schematic diagram in which the functions owned by the autonomous driving control device 30 and the navigation device 50 are classified and illustrated according to main processing contents, and the configurations of the autonomous driving control device 30 and the navigation device 50 may be divided into a larger number of blocks according to the processing contents. Furthermore, the functional block may be configured to execute a larger number of processing pieces by one block shown in FIG. 1. The processing of each block may be executed by one piece of hardware or may be executed by plural pieces of hardware. The processing of each block may be executed by one program or may be executed by plural programs.

The control programs stored in ROM 322 of the autonomous driving control device 30 and ROM (not shown) of the navigation device 50 may be downloaded from a server device on a network, loaded onto RAM and executed by CPU.

The processing units of the flowchart shown in FIGS. 3 and 4 are obtained by dividing the processing in the controller 580 of the navigation device 50 and the controller 32 of the autonomous driving control device 30 according to main processing contents in order to facilitate understanding. The present invention is not limited by the dividing manner or names of the processing units. The processing in the controller 580 of the navigation device 50 and the controller 32 of the autonomous driving control device 30 may be divided into a larger number of processing units according to the processing contents. Furthermore, one processing unit may be further divided so as to contain a larger number of processing pieces. Furthermore, the processing orders of the foregoing flowcharts are not limited to the examples shown in the figures.

The invention claimed is:

1. A route searching apparatus comprising:
a memory storing information on a control condition for controlling traveling of a vehicle; and
a controller that includes a CPU and that searches a guide route for the vehicle satisfying the control condition based on the information on the control condition acquired from the memory,
wherein the controller acquires, as the information on the control condition, a permission threshold value that is set for each traveling situation of the vehicle and permits execution of vehicle control corresponding to the traveling situation, and
when a lane shift is required as the traveling situation in a searched route, the controller compares a distance as the permission threshold value with a road length of a road on which the lane shift is executed, thereby determining whether the searched route is selected as the guide route for the vehicle.

2. A route searching apparatus comprising:
a memory storing information on a control condition for controlling traveling of a vehicle;
an information input unit connected to and controlled by a CPU and acquiring the information on the control condition for controlling traveling of the vehicle from the memory; and
a route searching unit connected to controlled by the CPU and searching a guide route for the vehicle satisfying the control condition based on the information on the control condition acquired by the information input unit,
wherein the information input unit acquires, as the information on the control condition, a permission threshold value that is set for each traveling situation of the vehicle and permits execution of vehicle control corresponding to the traveling situation, and
the route searching unit searches a guide route on which the vehicle is permitted to execute the vehicle control based on the permission threshold value,
wherein when a lane shift is required as the traveling situation in a searched route, the route searching unit determines whether the lane shift is a shift within a steering angle range of the vehicle as the permission threshold value, thereby determining whether the searched route is selected as the guide route for the vehicle.

3. The route searching apparatus according to claim 2, wherein the information input unit acquires a vehicle width of the vehicle as the information on the control condition, and
the route searching unit determines based on the information on the control condition whether a searched route is a route on which the vehicle travels, thereby determining whether the searched route is selected as the guide route for the vehicle.

4. The route searching apparatus according to claim 2, wherein the information input unit acquires, as the information on the control condition, information representing whether the vehicle travels at a roundabout, and
the route searching unit determines based on the information on the control condition whether the vehicle travels at a roundabout, thereby determining whether the searched guide route is selected as a route for the vehicle.

5. The route searching apparatus according to claim 2, wherein the vehicle is incorporated with an autonomous driving system for performing driving, braking and steering of the vehicle to make the vehicle travel autonomously, and
the route searching apparatus searches a traveling route on which the vehicle autonomously travels.

6. A method for searching a route in a route searching apparatus, the method comprising the steps of:
storing information on a control condition for controlling traveling of a vehicle in a memory;
acquiring the information on the control condition for controlling traveling of the vehicle in an information input unit which is connected to and controlled by a CPU; and
searching a guide route for the vehicle satisfying the control condition based on the information on the control condition acquired by the information input unit in a route searching unit which is connected to and controlled by the CPU,
wherein the step of acquiring information includes acquiring, as the information on the control condition, a permission threshold value that is set for each traveling situation of the vehicle and permitting execution of vehicle control corresponding to the traveling situation,
the step of searching includes searching a guide route on which the vehicle is permitted to execute the vehicle control based on the permission threshold value, and
wherein the step of searching includes determining whether the lane shift is a shift within a steering angle range of the vehicle as the permission threshold value when a lane shift is required as the traveling situation in a searched route, so as to determine whether the searched route is selected as the guide route for the vehicle.

7. The method for searching a route in a route searching apparatus according to claim 6, wherein the step of searching includes acquiring a vehicle width of the vehicle as the information on the control condition, and
the step of searching includes determining based on the information on the control condition whether a searched route is a route on which the vehicle travels, thereby determining whether the searched route is selected as the guide route for the vehicle.

8. The method for searching a route in a route searching apparatus according to claim 6, wherein the step of searching includes acquiring, as the information on the control condition, information representing whether the vehicle travels at a roundabout, and the step of searching includes determining based on the information on the control condition whether the vehicle travels at a roundabout, thereby determining whether the searched guide route is selected as a route for the vehicle.

9. The method for searching a route in a route searching apparatus according to claim 6, wherein the step of searching includes searching a traveling route on which the vehicle autonomously travels by a route searching apparatus of the vehicle which is incorporated with an autonomous driving system for performing driving, braking and steering of the vehicle to make the vehicle travel autonomously.

* * * * *